United States Patent [19]

Ogasawara et al.

[11] Patent Number: 4,784,978

[45] Date of Patent: Nov. 15, 1988

[54] HEXAGONAL BORON NITRIDE POWDER HAVING EXCELLENT SINTERABILITY AND A METHOD FOR THE PREPARATION THEREOF

[75] Inventors: Takeshi Ogasawara; Takahisa Koshida; Toshimitsu Koitabashi, all of Chiba; Kimiaki Sasaki, Hyogo, all of Japan

[73] Assignees: Kawasaki Steel Corporation; Kawasaki Refractories Co. Inc., both of Kyogo, Japan

[21] Appl. No.: 879,980

[22] Filed: Jun. 30, 1986

Related U.S. Application Data

[63] Continuation-in-part of Ser. No. 741,288, Jun. 4, 1985, abandoned.

[30] Foreign Application Priority Data

Jun. 7, 1984 [JP]  Japan .................................. 59-117375
Aug. 30, 1984 [JP] Japan .................................. 59-182379

[51] Int. Cl.$^4$ ............................................ C01B 21/064
[52] U.S. Cl. ........................................ 501/96; 423/290
[58] Field of Search ........................... 423/290; 501/96

[56] References Cited

U.S. PATENT DOCUMENTS

| | | | |
|---|---|---|---|
| 3,415,625 | 12/1968 | Babl et al. | 423/290 |
| 3,473,894 | 10/1969 | Babl et al. | 423/290 |
| 4,107,276 | 8/1978 | Schwetz et al. | 423/290 |
| 4,562,163 | 12/1985 | Endo | 501/96 |

FOREIGN PATENT DOCUMENTS

| | | | |
|---|---|---|---|
| 0811644 | 4/1969 | Canada | 423/290 |
| 2461821 | 12/1974 | Fed. Rep. of Germany | 423/290 |
| 0155507 | 8/1985 | Japan | 423/290 |
| 1179156 | 3/1967 | United Kingdom | 423/290 |

*Primary Examiner*—William R. Dixon, Jr.
*Assistant Examiner*—James M. Hunter, Jr.
*Attorney, Agent, or Firm*—Bierman and Muserlian

[57] ABSTRACT

The powder of hexagonal boron nitride is prepared by heat-treating a powdery mixture composed of an oxygen-containing boron compound, e.g. boric acid, and a nitrogen compound, e.g. dicyandiamide and melamine, with admixture of minor amounts of a carbonaceous powder, e.g. carbon black, and/or borax. Further, an alkaline earth metal compound such as calcium carbonate is added either to the powdery mixture of the starting materials before the heat treatment or to the powder after the heat treatment. The h-BN powder has excellent sinterability so that sintered bodies of boron nitride having a high density and high bending strength can readily be prepared by use of a hot press.

8 Claims, No Drawings

HEXAGONAL BORON NITRIDE POWDER HAVING EXCELLENT SINTERABILITY AND A METHOD FOR THE PREPARATION THEREOF

This is a continuation-in-part application from a copending U.S. patent application Ser. No. 741,288 filed June 4, 1985, now abandoned.

BACKGROUND OF THE INVENTION

The present invention relates to a hexagonally crystalline boron nitride powder, referred to as h-BN hereinbelow, capable of exhibiting excellent behavior in sintering and a method for the preparation thereof. More particularly, the invention relates to a powder of h-BN suitable as a starting material of sintered articles of boron nitride and a method for the preparation of such a h-BN powder.

As is known, h-BN is usually a white powder and the structure thereof is lamellar and crystallographically hexagonal like graphite. h-BN has unique characteristics in many respects including, in particular, heat conductivity, electric insulation, corrosion resistance, lubricity, heat resistance, mechanical workability and so on so that powders of h-BN are widely used in a variety of applications where these excellent properties can be fully utilized. For example, h-BN is used in the applications as an additive in plastics, lubricants and the like in the form of a powder and as jigs, electric insulators, molds and the like in the form of a shaped body and composite material.

Various methods have been developed for the preparation of h-BN useful in a wide variety of applications while the major processes currently practiced for the industrial production of h-BN include:

(1) a method by heating a mixture of borax and urea at a temperature of 800° C. or higher in an atmosphere of ammonia gas disclosed in Japanese Patent Publication No. 38-1610;

(2) a method by heating a mixture of boric acid or boron oxide and calcium phosphate in an atmosphere of ammonia gas disclosed in Japanese Patent Publication No. 42-24669; and (3) a method by heating a mixture of boric acid and a nitrogen-containing organic compound such as urea, melamine, dicyandiamide and the like at a temperature of 1600° C. or higher disclosed in Japanese Patent Publication No. 48-14559.

Several other methods also have been proposed for the preparation of h-BN. For example, Japanese Patent Publication No. 38-22852 teaches (4) a method of vapor-phase synthesis using boron trichloride and ammonia. The applicability of this method, however, is limited to the preparation of a h-BN product of special grade due to the high costs for the starting materials. With an object to improve the above described third method in which well-developed crystalline structure can hardly be obtained and (5) a method is proposed in Japanese Patent Publication 41-18579 according to which the reaction mixture is admixed with a compound of an alkaline earth metal to promote the growth of crystals. Further, Japanese Patent Publication No. 47-26600 proposes (6) a method for upgrading h-BN products in respect of purity in which a crude h-BN prepared from boric acid as the starting material is admixed with an alkali metal and heated at a temperature of 1000° C. or higher.

The above mentioned first method (1) is disadvantageous because the process is complicated due to the indispensable step of washing. Namely, the sodium constituent contained in a large amount in the starting borax begins to evaporate in the form of sodium oxide when the temperature of the reaction mixture is increased to 1000° C. or higher and the thus vaporized sodium oxide is condensed and deposited on the cold part of the reactor while sodium oxide is deliquescent and corrosive to damage the material or the reactor furnance so that the sodium constituent must be removed by washing with water after a step by heating. Similarly, the above described second method (2) also must include a step to remove the calcium phosphate added to the reaction mixture by washing with an acid.

The above described third method (3) has a problem that the purity of the product cannot be high enough unless the reaction temperature is extremely high at 1600° C. or higher. Further, similarly to the third method, the fifth method (5) to promote crystal growth by the addition of an alkaline earth metal compound also includes a step to remove the additive by washing with an acid.

The sixth method (6) for upgrading the h-BN product by the admixture of an alkali metal compound is disadvantageous because the process is very complicate and lengthy including the steps of synthesis of a crude h-BN at a temperature of 800° C. or higher, pulverization of the crude h-BN and admixture of an alkali metal compound, shaping of the mixture and a heat treatment at a temperature of 1000° C. or higher. In this method, the crude h-BN has a purity of only about 80% to be far from a high-purity product and the treatment for upgrading has an effect of removing the residual boron oxide merely by evaporation and not by further nitridation thereof. Accordingly, the content of boron in the starting material is exploited only in a very low percentage so that the method can hardly provide a complete solution of the problem.

Besides, Japanese Patent Publication No. 49-40124 proposes a method for the preparation of a sintered body of boron nitride by a process of hot-pressing of a powder for sintering which is a powder of boron nitride admixed with a borate of an alkaline earth metal. In such a method of hot-press for the preparation of a sintered body by admixing a boron nitride powder with a sintering aid, the starting boron nitride powder has properties identical to those in the conventional products and the method can provide no fundamental solution of the problems since the crystal growth in a high-purity boron nitride powder may cause anisotropy of the sintered body in the course of sintering while low-crystalline boron nitride powders usually have a low purity with a large content of impurities in addition to the sintering aid so that the sintered body has poor characteristics at high temperatures as a consequence.

Thus, a high-purity h-BN can be obtained in the prior art technology only by undertaking a heat treatment at a high temperature or a complicated step of washing with an acid and so on. In addition, a mere upgrading treatment of a h-BN powder in respect of purity is necessarily accompanied by the growth of crystallites while a boron nitride powder having a large crystallite size is not quite satisfactory as a material for the preparation of a sintered body due to the poor sintering behavior of the powder and the low mechanical strengths of the sintered body thereof at high temperatures.

SUMMARY OF THE INVENTION

An object of the present invention therefore is to provide a method for the preparation of a h-BN powder of high purity having a quasi-graphitic structure with a limited degree of crystallite growth and capable to produce sintered body of boron nitirde having excellent characteristics.

Another object of the invention is to provide a highly stable h-BN powder of high purity containing a very finely and uniformly dispersed alkaline earth metal compound as a stabilizing agent and having a quasi-graphitic structure with a limited degree of crystallite growth, which is capable to produce a sintered body of boron nitride having excellent characteristics, as well as a method for the preparation thereof.

The above described first object of the invention can be achieved by the method described below. Namely, a powdery mixture of boric acid, dehydrated boric acid, ammonium borate and a nitrogen compound is further admixed with a carbonaceous powder and borax or a related compound thereof and the powdery mixture is subjected to a heat treatment in a non-oxidizing atmosphere. This method can readily produce a h-BN powder of high purity but with a low degree of crystallite growth which can never be obtained in any conventional method.

The h-BN powder according to the above mentioned second object of the invention can be defined as a hexagonal boron nitride powder exhibiting excellent sintering behavior, in which 0.0001 to 0.1 mole of an alkaline earth metal is contained per mole of boron and the crystallites have a size in the range from 8 to 50 nm and the purity of which is at least 95% by weight relative to the content of boron nitride.

The starting material of such a powder is a mixture of boric acid, dehydrated boric acid, ammonium borate and a nitrogen compound and the powdery mixture is further admixed with a carbonaceous powder and/or borax or anhydrous borax thereof followed by a heat treatment in a non-oxidizing atmosphere to give a high-purity h-BN powder with a low degree of crystallite growth which can never be obtained in the conventional methods. Thereafter, an alkaline earth metal compound is uniformly dispersed in the thus prepared h-BN powder as a stabilizing agent of the boron oxide contained therein as an impurity or the oxygen incorporated into the crystallites of the h-BN to give the h-BN powder as desired.

The alkaline earth metal compound can be uniformly dispersed in the h-BN powder at any stage either prior to or succeeding the above mentioned heat treatment in a non-oxidizing atmosphere to give a highly stable h-BN powder capable of exhibiting excellent sintering behavior.

DETAILED DESCRIPTION OF THE PREFERRED EMBODIMENTS

In the following, a detailed description is given on the particular method, together with a presumable mechanism therein, for the preparation of a h-BN powder which is quite satisfactory as a base material of sintered bodies of boron nitride.

In the first place, the starting materials of the h-BN powder in the invention are an oxygen-containing boron compound and a nitrogen compound. While a variety of oxygen-containing boron compounds can be named to serve as the boron source, preferable compounds in view of the problem of leaving impurities after the reaction are exemplified by boric acid, dehydrated boric acid and ammonium borate. The nitrogen compound as the nitrogen source should preferably be a compound readily decomposable and removable at high temperatures as exemplified by urea, melamine, dicyandiamide, cyanuric acid, ammonium chloride and the like.

The blending ratio of these starting compounds in the powdery mixture should be such that the molar ratio of nitrogen to boron N/B is at least 1. The molar ratio of N/B in the mixture can be course be larger than 1 when further promotion of the nitridation reaction is desired. In an experiment, for example, boric acid and melamine were blended in a proportion to give a molar ratio of N/B equal to 2 and the mixture was heated in an atmosphere of ammonia to give a content of boron nitride in the product of 85% by weight or 92% by weight when the heating temperature was 1300° C. or 1500° C., respectively. The crystallite size $L_c$ in this case was 45 nm, the definition of $L_c$ being described later.

The value of purity of boron nitride in the h-BN powder given in this invention is a percentage of the content of nitrogen in the sample of the boron nitride determined by the analytical procedure of alkali fusion as divided by 56.5% which is the theoretical value of the nitrogen content in pure boron nitride.

As is known, the crystalline structure of boron nitride is varied depending on the conditions of synthesis. When boron nitride is synthesized by heating a mixture of boric acide and urea in an atmosphere of nitrogen gas, for example, boron nitride is formed even when the heating temperature is as low as 600° C. although the structure thereof is still not completely hexagonal but it has a random-layer structure as called in the crystallography, in which the adjacent layers are disposed at random positions relative to each other. Different from the boron nitride of such a random-layer structure, crystalline boron nitride usually has a hexagonal layered structure similar to that of graphite in which complete parallelism is held between the layers. When the temperature is further increased, transition of the random layer structure to a hexagonal structure gradually proceeds simultaneously with concurrent grain growth and upgrade of the purity as a result of the removable of boron oxide and ammonium borate as well as the oxygen and carbon in the crystallites and so on. When the temperature is further increased to exceed 1600° C., the primary particles grow to have a diameter of 1 micron or larger and the boron nitride obtained by further continuing the heating has a purity of 99% or higher with a completely hexagonal structure composed of primary particles having a diameter of 2 to 6 microns.

The crystalline structure of boron nitride can be quantitatively specified by the method of measurement of the crystallite size recommended by the 117th Committee of Japan Society for the Promotion of Science. The crystallite size can be expressed in terms of the average thickness thereof in the direction of c-axis, $L_c$, and the average diameter thereof in the direction of a-axis, $L_a$, while better accuracy can be obtained when the crystallite size is given by the value of $L_c$ because the peak for (002) has the highest intensity in the X-ray diffraction diagram.

To evaluate the crystalline structure with the values of $L_c$ as a measure, the boron nitride has a random-layer structure when the $L_c$ is about 10 nm or smaller while the structure is quasi-graphitic and completely hexagonal when the $L_c$ is in the range from about 10 to 40 nm and when the $L_c$ exceeds 40 nm, respectively. Accordingly, it should be construed that a boron nitride product having a quasi-graphitic structure implied in this invention has a value of $L_c$ in the range of about 10 to 40 nm.

It is of course that no clear demarcation can be given between the above mentioned structures of boron nitride relative to the values of $L_c$. For example, sintered bodies of boron nitride having best properties can be obtained when they are prepared from a boron nitride powder having a value of $L_c$ in the range from 8 to 50 nm. In other words, the boron nitride powder should have a value of $L_c$, preferably, in the range from 8 to 50 nm when it is used as a base material for the preparation of sintered bodies of boron nitride.

Investigations have been undertaken on the method for the preparation of a high-purity h-BN with a low degree of crystallite growth to have a value of $L_c$ of 20 nm or smaller at a temperature as low as possible. As a result, it has been concluded that the presence of boron oxide due to incomplete nitridation is responsible for the low purity of the h-BN and that the liquid phase formed of the boron oxide melting at a relatively low temperature of 450° C. is responsible for the crystallite growth which is intermediated by the intervening liquid phase and proceeds at a remarkable velocity at a temperature of 1600° C. or higher. Therefore, it is an unavoidable consequence that growth of the crystallites takes place when the boron nitride is subjected to a heat treatment at a temperature of 1600° C. or higher with an object to upgrade the boron nitride in respect of the purity by evaporating and removing the boron oxide. These situations lead to a conclusion that, in order to obtain a high-purity h-BN as desired with a low degree of crystallite growth, the impurities therein such as boron oxide and the like must be removed by evaporation and the conditions of heating must be sufficient to complete the removal of the constituents of the liquid phase such as boron oxide and the like before the temperature at which the crystallite growth proceeds at a significant velocity is reached.

Accordingly, the investigations were directed to the method of treatment which satisfies the above mentioned requirements. The discovery arrived at as result thereof is that:

(a) admixture of the powdery mixture of the starting materials with a carbonaceous powder and borax or a related compound thereof; and (b) admixture of the powdery mixture with a carbonaceous powder and/or borax or a related compound thereof as combined with further incorporation of an alkaline earth metal compound uniformly dispersed therein, are very effective for the removal of the impurities such as boron oxide and the like.

In the first place, an explanation is given on the mechanism by which borax and anhydrous borax thereof exhibit an advantageous effect in the powdery mixture. The borax and anhydrous borax thereof implied here are exemplified by anhydrous borax $Na_2B_4O_7$ and borax $Na_2B_4O_7 10H_2O$. The boron oxide $B_2O_3$ contained in the powdery mixture is converted into sodium metaborate having a low boiling point by reacting with the anhydrous borax or borax added thereto and the sodium metaborate is evaporated and removed at a temperature not exceeding 1500° C. so that the h-BN is imparted with an increased purity. Different from sodium oxide, the sodium metaborate vaporized in this case is not deliquescent and readily trapped and removed by condensing on a cold surface with almost no corrosive effect on the reactor walls. The sodium metaborate can be recovered and recycled to seve as a boron source in the next run. The anhydrous borax has a melting point at 740° C. which is higher than those of boric acid and boron oxide so that it plays a role as a carrier to increase the contacting area between the source material of boron and nitriding gas in the reaction of nitridation so that the reaction of nitridation can be promoted by virtue of the increase in the surface area pertaining to the reaction.

The amount of borax and/or related compounds thereof should preferably be in the range from 2.5 to 30% by weight calculated as anhydrous borax based on the boric acid, dehydrated boric acid and ammonium borate which is to say based on the amount of the oxygen-containing boron compound as one of the starting materials. When the amount thereof exceeds 30% by weight, sodium oxide is undesirably formed in addition to sodium metaborate. When the amount thereof is smaller than 2.5% by weight, on the other hand, the role as a carrier is played thereby only insufficiently so that the extent of the nitridation reaction is decreased at 1300° C. or below.

It should be noted that, although the purity of the boron nitride can be increased by the admixture of an alkali metal compound such as sodium carbonate which is reactive with boron oxide to form sodium metaborate, the formation of sodium oxide cannot be prevented unless the amount of the added sodium carbonate is limited while the role as a carrier cannot be fully played by a small amount of the additive so that no improvement can be obtained in the purity of the h-BN when treatment is preformed at 1300° C. or below.

The carbonaceous powder is another additive which promotes evaporation of boron oxide. Namely, boron oxide $B_2O_3$ is reduced by the carbonaceous powder to give a lower oxide of boron $B_2O_2$ having higher vaporizability than $B_2O_3$. The carbonaceous powder used in the invention is not particularly limited to a specific type ranging from an amorphous carbon powder to a highly graphitized powder although amorphous carbonaceous powders are preferred. The amount of the carbonaceous powder to be added to the powdery mixture should be determined depending on the amount of the residual boron oxide $B_2O_3$ and preferably be equimolar to the amount of $B_2O_3$. When the amount of the carbonaceous powder is too large, the excess thereof may remain unreacted in the boron nitride product. Assuming that the purity of the crude h-BN is 70% by weight, which is the value usually achieved in the conventional methods, or higher, the carbonaceous powder should be added to the powdery mixture in an amount of 0.1 mole or smaller as carbon per mole of boron in the boron compound. When the amount of the carbonaceous powder is smaller than 0.005 mole, the effect of reduction as desired cannot be obtained. Thus, the amount of the carbonaceous powder should preferably be in the range from 0.005 to 0.1 mole per mole of boron.

Although the carbonaceous powder and borax or anhydrous borax thereof are equally effective from the standpoint of promotion of the nitridation reaction and removal of impurities, they are quite differently effective in respect of crystalite growth, when borax or anhydrous borax thereof is used as the additive, a liquid phase is formed at a relatively low temperature and the evaporation of sodium metaborate as the product is preceded by the growth of h-BN through the liquid phase resulting in an increased size of the crystallites. Therefore, it is necessary when borax or anhydrous borax thereof is used that the temperature of heating should be as low as possible to retard the growth of crystallites.

The behavior of carbonaceous powders is clearly different from borax or anhydrous borax thereof. When a carbonaceous powder is used as the additive, no liquid phase is formed therefrom but, on the contrary, the fine particles of the carbonaceous powder are dispersed in the liquid phase to decrease the viscosity and the activity of the liquid phase so that growth of the grains is retarded. Therefore, carbonaceous powders are preferable to borax or anhydrous borax thereof in order to obtain a h-BN product having a lower degree of crystallinity.

The particles of the carbonaceous powder should be as fine as possible from the standpoint of diskpersibility because the particles of the carbonaceous powder intervene as a solid between the grains of h-BN. In this regard, a synergistic effect can be expected by the combined use of a carbonaceous powder with borax or anhydrous borax thereof capable of forming a liquid phase since the borax of anhydrous borax thereof is highly effective in respect of promotion of the nitridation reaction at a relatively low temperature along with the effect of improving the contacting condition between the grains of h-BN and the particles of the carbonaceous powder as a grain-growth retarding agent.

When a carbonaceous powder and borax or anhydrous borax thereof are used in combination according to the method of the present invention, the respective effects for improving the purity of the h-BN are synergistically combined so that the treatment can be performed at a relatively low temperature to retard the growth of the crystallites. This is the principle of the inventive method for the preparation of a h-BN powder capable of exhibiting excellent behavior in sintering.

In connection with the moment when the above described additives should be added with the objects of retardation of the grain growth and increase of the purity, the carbonaceous powder, which serves to reduce the boron oxide $B_2O_3$ as an impurity and to remove the same partly in the form of $B_2O_2$, can be added at any stage before the temperature reaches 1300° C. above which the above mentioned reaction proceeds effectively. When a h-BN powder is synthesized from boric acid, dehydrated boric acid or ammonium borate as the starting material, for example, it is a possible way that the reaction mixture under sintering at a temperature, which should be 1300° C. or below, is taken out of the reactor furnace and then admixed with a carbonaceous powder with disintegration of the sintered material. The simplest way in respect of the working efficiency is of course that the carbonaceous powder is added to and blended with the powdery mixture of the starting materials. When the additive is borax or anhydrous borax thereof, a particularly large effect can be obtained by adding the same to the powdery mixture of the starting materials because the additive may partly pertain to the nitridation reaction.

When increase in the purity of the h-BN or preparation of a low-crystalline h-BN by the carbonaceous powder is the only target, the additive may be added at any stage when the temperature does not exceed 1300° C.

As one of the necessary conditions for the preparation of a h-BN according to the invention, the atomosphere in which the powdery mixture is heated should be a non-oxidizing atmosphere of an inert gas, ammonia gas and the like in order to prevent oxidation of the h-BN. The temperature of the heat treatment should be in the range from 1300° C., above which the impurities can be evaporated effectively, to 1600° C., below which the crystallites do not grow significantly. Preferably, however, the temperature should be in the range from 1500 to 1600° C. so as to prevent sodium oxide $Na_2O$ formed from the sodium content in the borax from remaining in the boron nitride as an impurity.

Further, the heat treatment may be performed in an atmosphere under reduced pressure other than the normal atmospheric pressure of the preceding paragraph so as to facilitate evaporation and removal of sodium metaborate and boron oxide $B_2O_3$ as the impurities formed by the addition of borax or oxides of boron, i.e. $B_2O_2$ and $B_2O_3$, as the impurities formed by the addition of the carbonaceous powder. It is a very advantageous way from the standpoint of energy saving and productivity that the heat treatment is performed at a temperature of 1300° C. or higher under reduced pressure since the h-BN can be purified efficiently to complete the treatment of purification within a relatively short time.

In the next place, an explanation is given of the effect obtained by the addition of an alkaline earth metal compound.

Although the boron oxide $B_2O_3$ as an impurity can be removed efficiently from a h-BN by the addition of a carbonaceous powder or borax or anhydrous borax thereof, as is described above, the removal of the boron oxide impurity in this case cannot be complete and the resultant h-BN always contains a very small amount of residual boron oxide $B_2O_3$ left unremoved.

The residual boron oxide $B_2O_3$ is subject to volume expansion when it is reacted with the moisture in the atmospheric air. Since the boron oxide $B_2O_3$ has a low melting point at 450° C., moreover, a sintered body prepared from a h-BN powder would have a decreased strength at high temperatures, e.g. 1000° C., as the content of boron oxide $B_2O_3$ in the h-BN powder is increased.

Accordingly, investigations have been undertaken to discover a method for the stabilization of the boron oxide $B_2O_3$ in the sintered body and conversion thereof to another compound having a higher melting point to find that an advantageous effect can be obtained by the addition of an alkaline earth metal compound or, in particular, a carbonate compound of an alkaline earth metal. When the powdery mixture is admixed with calcium carbonate $CaCO_3$ and subjected to the heat treatment, for example, calcium oxide $CaO$ reacts with the boron oxide $B_2O_3$ to form several high-melting compounds such as $CaO.B_2O_3$ having a melting point at 1125° C., $2CaO.B_2O_3$ having a melting point at 1280° C., $3CaO.B_2O_3$ having a melting point at 1454° C. and the like, which compounds are stable even at elevated temperatures.

The amount of the alkaline earth metal compound to be added should be balanced with the residual amount of the boron oxide $B_2O_3$ in the h-BN product. Assuming that a so-called high-purity boron nitride has a purity of at least 95% by weight as boron nitride with an impurity content lower than 5% by weight, the alkaline earth metal compound should be added in an amount of 0.1 mole or smaller as the alkaline earth metal per mole of boron in the oxygen-containing boron compound in the starting materials.

In the method for obtaining a high-purity h-BN without a heat treatment at high temperatures as an object of the present invention, in which the boron nitride product has a purity of about 99.95% by weight as an upper limit, on the other hand, the alkaline earth metal compound should be added in an amount of 0.0001 mole or larger per mole of the boron in the oxygen containing boron compound.

It is a convenient way from the standpoint of conducting the process of manufacturing that the alkaline earth metal compound is added in the course of blending of the starting materials in the form of a carbonate, oxide, hydroxide and the like of the alkaline earth metal. It is also possible to admix the alkaline earth metal compound with a low-crystalline, high-purity h-BN powder. In this case, the alkaline earth metal compound as the additive must be blended uniformly with the fine particles of the h-BN. An effective method in this regard is that the h-BN is uniformly blended with a soluble compound such as nitrates of the alkaline earth metal dissolved in a solvent.

When the method of the present invention is undertaken with further admixture of an alkaline earth metal compound, a h-BN powder of high purity having a low crystallinity and high stability can easily be prepared by use of either a carbonaceous powder alone or a carbonaceous powder and borax or a related compound thereof in combination.

When borax or a related compound thereof is added to the powdery mixture to prevent growth of crystallites by the heat treatment at a relatively low temperature, the mixture after the reaction should be washed with water and dried in order to increase the purity.

The heat treatment at a relatively low temperature implied in this invention is a treatment of heating at a temperature at which no significant vaporization takes place of the borax added to the starting mixture or sodium metaborate and sodium oxide fromed as the by-products and the boron nitride can be imparted with increased purity without noticeable grain growth. The temperature, in particular, is in the range from 900° to 1300° C. while the temperatures of vaporization of borax, sodium metaborate and sodium oxide are 1575° C., 1430° C. and 1275° C., respectively.

The boron nitride product as synthesized in the above described manner is in a conglomerated form and should be disintegrated or pulverized prior to processing into a sintered body. It is a usual practice that the powder thus pulverized is granulated with an object to improve packability of a metal mold. The granulation is performed by the spray-drying method of an aqueous slurry of the powder. It is advantageous that the powder is subjected at least once or, preferably, several times to a treatment of washing and dehydration before it is slurried in an aqueous medium so as to ensure uniformity of the products by washing away the residual sodium constituents or boron oxide as the impurities. Since h-BN powders are hydrophobic on the surface, the aqueous dispersing medium for the h-BN powder should contain a surface active agent dissolved therein. Alternatively, organic solvents such as alcohols can be used quite satisfactorily as a dispersing medium of the h-BN powder.

The h-BN powder prepared according to the above described method is ensured to have a high purity, stability and excellent sinterability at high temperatures without significant growth of the crystallities. The product is a hexagonal boron nitride powder containing from 0.0001 to 0.1 mole of an alkaline earth metal per mole of boron and having a high purity of at least 95% by weight as boron nitride, of which the crystallites have a small size of 8 to 50 nm. Further, the powder exhibits excellent sintering behavior in the preparation of a sintered body and the sintered bodies thus prepared have very high mechanical strengths at high temperatures.

In the following, the method of the present invention is described in more detail by way of examples.

EXAMPLE 1

A powdery mixture was prepared by thoroughly blending 1.8 kg of boric acid, 2 kg of melamine, 200 g of anhydrous borax and 25 g of carbon black in a V-blender and the powdery mixture was introduced into a graphic crucible having an inner diameter of 200 mm and a depth of 300 mm and, with the cover of the crucible put thereon, subjected to a heat treatment at 1600° C. in a high-frequency furnace for 2 hours in an atmosphere of nitrogen gas. The conglomerated product obtained by this heat treatment had a purity of 98.9% by weight as boron nitride, of which the value of the crystallite size $L_c$ was 32 nm.

EXAMPLES 2 TO 9 AND COMPARATIVE EXAMPLE

In each of the Examples and Comparative Example, h-BN was synthesized using boric acid or ammonium borate as the boron source and dicyandiamide, melamine or urea as the nitrogen source with admixture of an alkaline earth metal compound, carbonaceous powder and anhydrous borax. The formulations are summarized in Table 1 below.

Following is a description of the procedure of the synthesis taking Example 4 as a typical case.

A powdery mixture was prepared by uniformly blending 1.8 kg of boric acid and 2.0 kg of melamine with admixture of 150 g of anhydrous borax having a particle size distribution to pass a screen of 200 mesh opening, 20 g of carbon black and 10 g of calcium carbonate having a particle size distribution to pass a screen of 200 mesh opening in a V-blender. The powdery mixture was introduced into a graphite crucible having an inner diameter of 200 mm and a depth of 300 mm and, with the cover of the crucible put thereon, subjected to a heat treatment at 1550° C. in a high-frequency furnace for 1 hour in an atmosphere of nitrogen gas. The mixture conglomerated by the heat treatment was pulverized in a jet mill with particle size classification to give a fine powder which had purity of 97.2% by weight as boron nitride and contained 0.7% by weight of calcium oxide CaO. The degree of crystallite growth therein was low and the value of the crystallite size $L_c$ was 10.2 nm. The thus obtained fine powder was shaped in a hot press at 1900° C. under a pressure of 200 kg/cm² for 2 hours into a sintered body which had a density of 2.12 g/cm³ and a bending strength of 8.9 kg/mm² at 1000° C. and was excellent in comparison with sintered bodies of boron nitride prepared according to a conventional method.

The anhydrous borax was omitted in the formulations of Examples 2 and 7 and the carbonaceous powder was omitted in the formulations of Examples 3 and 8 while both of the anhydrous borax and carbonaceous powder were admixed in the formulations of Examples 4, 5, 6 and 9.

The formulations of the starting powdery mixtures in examples 7, 8 and 9 were the same as in Examples 2, 3 and 4, respectively, but the schedule of the heat treatment was different. Namely, the powdery mixture was first heated at a temperature up to 900° C. in a high-frequency furnace under an atmosphere of nitrogen gas followed by a heat treatment at 1550° C. for 1 hour under a reduced pressure of 0.1 Torr.

Each of the thus prepared h-BN powders had a high purity of boron nitride with a low degree of crystallite growth and was capable of giving a sintered body having a high strength at high temperatures by shaping using a hot press.

In Comparative Example, the amount of the carbon black was increased so that the molar ratio of the carbonaceous powder to the boron in the starting powdery mixture was 1.03:1 and the amount of anhydrous borax was also increased to 50% by weight of the boric acid. The h-BN powder obtained in this manner, which was, different from boron nitride per se, not white but black in color, had a very low purity of 68% by weight as boron nitride and contained large amounts of impurities including 6.4% by weight of calcium oxide CaO, 8.6% by weight of free carbon C and 5.9% by weight of sodium oxide $Na_2O$. The sintered body shaped from this h-BN powder using a hot press had poor characteristic properties.

As a control experiment, a further sintered body was prepared using a hot press under the same conditions as in Example 1 from a fine powdery mixture of a commercially available boron nitride powder having a purity of 97% by weight with admixture of 1.5% by weight of calcium carbonate in a ball mill. The thus prepared sintered boron nitride body had a density of 1.94 g/cm$^3$ and a bending strength of 3.1 kg/mm$^2$ at 1000° C.

TABLE 1-a

| Example | Starting material boron source | Starting material nitrogen source | additive alkaline earth metal compound | additive carboncenous powder | additive anhydrous broax |
|---|---|---|---|---|---|
| 2 | boric acid 1.8 kg | dicyandiamide 2 kg | $BaCO_3$ 2.5 g | carbon black 40 g | — |
| 3 | boric acid 1.8 kg | melamine 2 kg | $CaCO_3$ 5 g | — | 200 g |
| 4 | boric acid 1.8 kg | melamine 2 kg | $CaCO_3$ 10 g | carbon black 20 g | 150 g |
| 5 | boric acid 1.8 kg | melamine 2 kg | $BaCO_3$ 5 g | carbon black 20 g | 150 g |
| 6 | ammonium borate 1 kg | urea 2.5 kg | $CaCO_3$ 15 g | pitch 10 g | 250 g |
| 7 | boric acid 1.8 kg | dicyandiamide 2 kg | $BaCO_3$ 2.5 g | carbon black 40 g | — |
| 8 | boric acid 1.8 kg | melamine 2 kg | $CaCO_3$ 5 g | — | 200 g |
| 9 | boric acid 1.8 kg | melamine 2 kg | $CaCO_3$ 10 g | carbon black 20 g | 150 g |
| C-1 | boric acid 1 kg | dicyandiamide 1.5 kg | $CaCO_3$ 100 g | carbon black 200 g | 500 g |

TABLE 1-b

| Example | condition of preparation h-BN powder purity % | condition of preparation h-BN powder crystallite size $L_c$ nm | condition of preparation h-BN powder content of alkaline earth metal oxide % | properties of the sintered body density g/cm$^3$ | properties of the sintered body bending strength at 1000° C. kg/mm$^3$ |
|---|---|---|---|---|---|
| 2 | 96.8 | 10.5 | BaO 0.6 | 1.97 | 6.2 |
| 3 | 98.2 | 20.2 | CaO 0.6 | 2.03 | 8.1 |
| 4 | 97.2 | 10.2 | CaO 0.7 | 2.12 | 8.9 |
| 5 | 97.3 | 9.2 | BaO 1.1 | 2.12 | 10.3 |
| 6 | 97.3 | 11.7 | CaO 0.9 | 2.08 | 6.9 |
| 7 | 97.8 | 9.7 | BaO 0.9 | 1.96 | 9.1 |
| 8 | 98.6 | 10.4 | CaO 0.7 | 2.06 | 8.3 |
| 9 | 98.1 | 9.1 | CaO 0.8 | 2.07 | 11.7 |
| C-1 | 68.0 | 8.2 | CaO 6.4 C 8.6 $Na_2O$ 5.9 | 2.07 | 1.8 |

EXAMPLES 10 AND 11

In Example 10, 1.8 kg of boric acid, 2.0 kg of melamine and 20 g of carbon black were thoroughly blended in a V-blender and the powdery mixture was introduced into a graphite crucible having an inner diameter of 200 mm and a depth of 300 mm and, with the cover of the crucible put thereon, subjected to a heat treatment at 1550° C. in a high-frequency furnace for 1 hour in an atmosphere of nitrogen gas. The thus formed conglomerated mass of the powder was disintegrated and pulverized in a ball mill for 30 hours with admixture of calcium nitrate $Ca(NO_3)_2$ in an amount of 1.2 g per 100 g of the boron nitride to give a fine powder. This powder had a purity of 97.7% by weight as boron nitride and contained 0.4% by weight of calcium oxide CaO. The size of the crystallites $L_c$ in this powder was 15.8 nm.

The thus obtained h-BN powder was shaped and sintered into a sintered body by using a hot press at a temperature of 1900° C. under a pressure of 200 kg/cm$^2$ for 2 hours. The sintered body had a density of 2.01 g/cm$^3$ and a bending strength of 4.8 kg/mm$^2$ at 1000° C.

The experimental procedure in Example 11 was substantially the same as in Example 10 except that the starting powdery mixture was composed of 1.8 kg of boric acid, 2.0 kg of dicyandiamide, 25 g of carbon black and 200 g of anhydrous borax.

The h-BN powder obtained in this manner had a purity of 98.2% by weight and contained 0.4% by weight of calcium oxide CaO and the crystallite size $L_c$ therein was 22.4 nm. The sintered body shaped of this powder in the same manner as in example 10 had a density of 1.97 g/cm$^3$ and a bending strength of 6.1 kg/mm$^2$ at 1000° C.

EXAMPLES 12 AND 13

In Example 12, 1.8 kg of boric acid, 2.0 kg of melamine, 10 g of calcium carbonate and 150 g of anhydrous borax were thoroughly blended in a V-blender and the powdery mixture was introduced into a graphite crucible having an inner diameter of 200 mm and a depth of 300 mm and, with the cover of the crucible put thereon, subjected to a heat treatment at 1100° C. in a high-frequency furnace for 2 hours in an atmosphere of nitrogen gas. The thus obtained product in the form of a conglomerated mass had a purity of 94.3% by weight as boron nitride and contained 0.7% by weight and 1.2% by weight of calcium oxide CaO and sodium oxide Na$_2$O, respectively. The size $L_c$ of the crystallites therein was 14.2 nm.

The conglomerated mass was disintegrated and then dispersed and agitated in an aqueous solution containing 2% by weight of an anionic surface active agent having a value of HLB of 14 such as a polyoxyalkylene alkyl ether to be washed followed by dehydration by filtration under suction and drying. The thus obtained h-BN powder had a purity of 97.7% by weight as boron nitride and contained 0.9% by weight and 0.007% by weight of calcium oxide CaO and sodium oxide Na$_2$O, respectively, to indicate the effect of purification.

This fine powder of h-BN was shaped under the same conditions as in the preceding example into a sintered body which had a density of 1.96 g/cm$^3$ and a bending strength of 5.3 kg/mm$^2$ at 1000° C.

In Example 13, a powdery mixture composed of 1.8 kg of boric acid, 2.0 kg of melamine and 200 g of anhydrous borax was subjected to a heat treatment in a graphite crucible having an inner diameter of 200 mm and a depth of 300 mm with the cover put thereon in a high-frequency furnace at 1200° C. for 2 hours under an atmosphere of nitrogen gas. The thus obtained conglomerated mass had a purity of 95.2% by weight as boron nitride and contained 1.6% by weight of sodium oxide Na$_2$O. The size of the crystallites therein $L_c$ was 22.5 nm.

The conglomerated mass was disintegrated into a powdery form which was dispersed and agitated in an aqueous solution containing 2% by weight of an anionic surface active agent having an HLB value of 14 to be washed followed by dehydration by filtration with suction and drying. This dried h-BN powder was admixed with calcium nitrate Ca(NO$_3$)$_2$ in an amount of 1.2 g per 100 g of boron nitride in a ball mill for 30 hours to give a fine powder which had a purity of 98.2% by weight as boron nitride and contained 0.4% by weight and 0.01% by weight of calcium oxide CaO and sodium oxide Na$_2$O to show the effect of purification.

This fine powder of h-BN was shaped under the same conditions as in the preceding example into a sintered body which had a density of 1.98 g/cm$^3$ and a bending strength of 4.5 kg/mm$^2$ at 1000° C.

What is claimed is:

1. A powder of hexagonal boron nitride with excellent sinterability having a purity of at least 95% by weight as boron nitride and containing an alkaline earth metal compound in an amount from 0.0001 to 0.1 mole calculated as alkaline earth metal per mole of boron, of which the crystallites (Lc) have a size in the range from 8 to 50 nm.

2. A powder of hexagonal boron nitride with excellent sinterability having a purity of at least 95% by weight as boron nitride and containing a calcium oxide or a barium oxide in an amount from 0.0001 to 0.1 mole calculated as calcium or barium per mole of boron, of which the crystallites ($L_c$) have a size in the range from 8 to 50 nm.

3. A method for the preparation of a powder of hexagonal boron nitride having excellent sinterability which comprises the steps of:
   (a) mixing boric acid, dehydrated boric acid, ammonium borate and a nitrogen compound selected from the group consisting of urea, melamine, dicyandiamide, cyanuric acid and ammonium chloride to produce a powdery mixture;
   (b) admixing the powdery mixture with 0.005 to 0.1 moles of a carbonaceous powder calculated as carbon per mole of boron in the powdery mixture and 2.5 to 30% by weight of borax or anhydrous borax calculated as anhydrous borax based on the boric acid, dehydrated boric acid and ammonium borate in the powdery mixture; and
   (c) subjecting the powdery mixture to a heat treatment in a non-oxidizing atmosphere.

4. A method for the preparation of a powder of hexagonal boron nitride having excellent sinterability which comprises the steps of:
   (a) mixing boric acid, dehydrated boric acid, ammonium borate and a nitrogen compound selected from the group consisting of urea, melamine, dicyandiamide, cyanuric acid and ammonium chloride to produce a powdery mixture;
   (b) admixing the powdery mixture with 0.0001 to 0.1 mole of a calcium oxide or a barium oxide calculated as calcium or barium per mole of boron in the powdery mixture;
   (c) admixing the powdery mixture with a carbonaceous powder and at least one member selected from the group consisting of borax and anhydrous borax, the amount of the carbonaceous powder being in the range from 0.005 to 0.1 mole calculated as carbon per mole of boron in the powdery mixture and the amount of borax or anhydrous borax being in the range from 2.5 to 30% by weight calculated as anhydrous borax based on boric acid, dehydrated boric acid and ammonium borate in the powdery mixture; and
   (d) subjecting the powdery mixture to a heat treatment in a non-oxidizing atmosphere.

5. A method for the preparation of a powdery composition of hexagonal boron nitride having excellent sinterability which comprises the steps of:
   (a) mixing boric acid, dehydrated boric acid, ammonium borate and a nitrogen compound selected from the group consisting of urea, melamine, dicyandiamide, cyanuric acid and ammonium chloride to produce a powdery mixture;

(b) admixing the powdery mixture with 0.005 to 0.1 mole of a carbonaceous powder calculated as carbon per mole of boron in the powdery mixture;

(c) subjecting the powdery mixture to a heat treatment in a non-oxidizing atmosphere to obtain a powder of hexagonal boron nitride; and (d) admixing the powder of hexagonal boron nitride with 0.0001 to 0.1 mole of a calcium oxide or a barium oxide calculated as calcium or barium per mole of boron in the powder of hexagonal boron nitride.

6. A method for the preparation of a powdery composition of hexagonal boron nitride having excellent sinterability which comprises the steps of:

(a) mixing boric acid, dehydrated boric acid, ammonium borate and a nitrogen compound selected from the group consisting of urea, melamine, dicyandiamide, cyanuric acid and ammonium chloride to produce a powdery mixture;

(b) admixing the powdery mixture with 0.005 to 0.1 mole of a carbonaceous powder calculated as carbon per mole of boron in the powdery mixture and 2.5 to 30% by weight of borax or anhydrous borax calculated as anhydrous borax based on boric acid, dehydrated boric acid and ammonium borate in the powdery mixture;

(c) subjecting the powdery mixture to a heat treatment in a non-oxidizing atmosphere to obtain a powder of hexagonal boron nitride; and (d) admixing the powder of hexagonal boron nitride with 0.0001 to 0.1 mole of a calcium oxide or a barium oxide calculated as calcium or barium per mole of boron in the powder of hexagonal boron nitride.

7. A method for the preparation of a powder of hexagonal boron nitride having excellent sinterability which comprises the steps of:

(a) mixing boric acid, dehydrated boric acid, ammonium borate and a nitrogen compound selected from the group consisting of urea, melamine, dicyandiamide, cyanuric acid and ammonium chloride to produce a powdery mixture;

(b) admixing the powdery mixture with 0.005 to 0.1 mole of a carbonaceous powder calculated as carbon per mole of boron in the powdery mixture;

(c) admixing the powdery mixture with 0.0001 to 0.1 mole of a calcium oxide or barium oxide calculated as calcium or barium per mole of boron in the powdery mixture and 2.5 to 30% by weight of borax or anhydrous borax calculated as anhydrous borax based on boric acid, dehydrated boric acid and ammonium borate;

(d) subjecting the powdery mixture to a heat treatment in a non-oxidizing atmosphere at a temperature of 900° to 1300° C. to obtain a crude powder of hexagonal boron nitride; and (e) washing the crude powder of hexagonal boron nitride followed by drying.

8. A method for the preparation of a powdery composition of hexagonal boron nitride having excellent sinterability which comprises the steps of:

(a) mixing boric acid, dehydrated boric acid, ammonium borate and a nitrogen compound selected from the group consisting of urea, melamine, dicyandiamide, cyanuric acid and ammonium chloride to produce a powdery mixture;

(b) admixing the powdery mixture with 0.005 to 0.1 mole of a carbonaceous powder calculated as carbon per mole of boron in the powdery mixture;

(c) admixing the powdery mixture with 2.5 to 30% by weight of borax or anhydrous borax calculated as anhydrous borax based on the boric acid, dehydrated boric acid and ammonium borate in the powdery mixture;

(d) subjecting the powdery mixture to a heat treatment in a non-oxidizing atmosphere at a temperature of 900° C. to 1300° C. to obtain a crude powder of hexagonal boron nitride;

(e) washing the crude powder of hexagonal boron nitride followed by drying; and (f) admixing the dried powder of hexagonal boron nitride with 0.0001 to 0.1 mole of a calcium oxide or barium oxide calculated as calcium or barium per mole of boron in the dried powder.

* * * * *